United States Patent
Samajpati (10) Patent No.: US 8,165,143 B2
(45) Date of Patent: Apr. 24, 2012

(54) ROUTING PROTOCOL APPARATUS, SYSTEMS, AND METHODS

(75) Inventor: Sumit Samajpati, Bangalore (IN)

(73) Assignee: Novell, Inc., Provo, UT (US)

( * ) Notice: Subject to any disclaimer, the term of this patent is extended or adjusted under 35 U.S.C. 154(b) by 249 days.

(21) Appl. No.: 12/724,635

(22) Filed: Mar. 16, 2010

(65) Prior Publication Data

US 2011/0228777 A1 Sep. 22, 2011

(51) Int. Cl.
H04L 12/28 (2006.01)

(52) U.S. Cl. .......................... 370/401; 370/252; 370/392

(58) Field of Classification Search .................... None
See application file for complete search history.

(56) References Cited

U.S. PATENT DOCUMENTS

| | | | |
|---|---|---|---|
| 6,856,991 B1 * | 2/2005 | Srivastava | 1/1 |
| 7,177,295 B1 | 2/2007 | Sholander et al. | |
| 7,460,532 B2 | 12/2008 | Shin et al. | |
| 2004/0090922 A1 * | 5/2004 | Jason et al. | 370/252 |
| 2005/0030921 A1 | 2/2005 | Yau | |
| 2008/0170550 A1 | 7/2008 | Liu et al. | |

OTHER PUBLICATIONS

"Zone Routing Protocol", http://en.wikipedia.org/wiki/Zone_Routing_Protocol, From Wikipedia, downloaded Feb. 3, 2010, (Oct. 15, 2009).

Maleki, M., et al., "Lifetime prediction routing in mobile ad hoc networks", *2003 IEEE Wireless Communications and Networking, WCNC 2003*, (2003), 1185-1190.

Maleki, M., et al., "Power-aware source routing protocol for mobile ad hoc networks", *International Symposium on Low Power Electronics and Design, Proceedings of the 2002 International Symposium on Low Power Electronics and Design*, (2002), 72-75.

Pearlman, Marc, et al., "Alternate Path Routing in Mobile Ad Hoc Networks", *IEEE MILCOM 2000. 21st Century Military Communications Conference Proceedings*, (2000), 501-506.

Woo, K., et al., "Non-Blocking, Localized Routing Algorithm for Balanced Energy Consumption in Mobile Ad Hoc Networks", *Ninth International Symposium on Modeling, Analysis and Simulation of Computer and Telecommunication Systems, 2001. Proceeding*, (2001), 117-124.

* cited by examiner

*Primary Examiner* — Duc C Ho (74) *Attorney, Agent, or Firm* — Schwegman, Lundberg & Woessner, P.A.

(57) ABSTRACT

Apparatus, systems, and methods may operate to traverse intermediate nodes in a network during message routing operations to determine an original routing path for a source message by using proactive routing between clusters of nodes in the network, and both proactive and reactive routing within the clusters; to select the original routing path according to a greedy energy strategy that operates to define the original routing path as a path having a greater energy value associated with the intermediate nodes than other paths; and upon discovery of selfish nodes, to direct removal of the selfish nodes from route caches associated with traversed nodes, and to determine an alternate routing path for the source message in the network by searching upstream route caches in the traversed nodes in the network to discover the alternate path. Additional apparatus, systems, and methods are disclosed.

19 Claims, 4 Drawing Sheets

ROUTING PROTOCOL APPARATUS, SYSTEMS, AND METHODS

BACKGROUND

As mobile computing devices operate to provide increasing levels of computation and communication, energy efficiency concerns increase as well, especially when the devices are battery-operated. In ad hoc networks, where multiple nodes are tasked with forwarding data packets from their neighbors, it is useful to reduce energy consumption along the route, and to balance individual device energy levels. This is because unbalanced energy usage can result in early node failure (e.g., when nodes become overloaded), which in turn may lead to network partitioning and reduced network lifetime. In addition, when a node along the route fails during the routing process, data transmission is typically re-started from the source node, causing congestion in the network and increasing the complexity of the routing algorithm.

SUMMARY

In various embodiments, apparatus, systems, and methods operate to support a routing protocol that discovers alternate routing paths in the presence of selfish nodes, without forcing route discovery to begin again at the source node. For example, in some embodiments, the routing protocol is implemented by traversing intermediate nodes in the network during message routing operations to determine an original routing path for a source message. Proactive routing can be used between clusters of nodes in the network, with both proactive and reactive routing used inside the clusters. The original routing path may be selected according to a greedy energy strategy that operates to define the original routing path as a path having a greater energy value associated with the intermediate nodes than other paths. Intermediate nodes that discover selfish nodes along the route may be used to direct removal of the selfish nodes from route caches associated with traversed nodes, and to determine an alternate routing path for the source message in the network by searching upstream route caches in the traversed nodes to discover the alternate path.

In some embodiments, the routing protocol is implemented by receiving at an intermediate node, from a source node, a route request message associated with a destination node. When the intermediate node has a route to the destination node in its route cache and energy associated with the intermediate node is above a threshold, the intermediate node may increment a counter associated with the intermediate node and send a message to additional nodes along the route to cache the route, to increment corresponding node counters, and to ignore later route requests.

When the intermediate node does not have the route in the route cache and the energy associated with the intermediate node is above the threshold, the intermediate node may increment its associated counter, broadcast a counter check message to neighboring nodes, and direction the removal of entries in the route caches of other nodes, where the entries are associated with the neighboring nodes that reveal themselves to be selfish nodes in response to the counter check message.

When none of the neighboring nodes reveal themselves to be selfish nodes in response to the counter check message, the intermediate node may broadcast the route request message comprising: traversed node identifications, indications of values of the counter and the energy associated with the intermediate node, and ignore later route requests. Additional embodiments are described, and along with the foregoing examples, will be set forth in detail below.

DETAILED DESCRIPTION

In various embodiments, a routing protocol can be implemented using an energy monitoring mechanism combined with alternative path routing when dead nodes appear. Selfish nodes along the route that are not willing to participate are forced to do so if they want to send their own data.

The proposed mechanism includes new routing strategies that can be applied to ad-hoc mobile networks within a commercial network, where all nodes are not willing to participate in routing the communication of other nodes—entering the network only when they desire to originate communication. These selfish nodes are monitored, and forced to participate if they wish to continue originating messages that are to be routed within the network. An alternative route path is developed when nodes along the established route die, or continue to maintain their selfish characteristics.

Ad hoc networks comprise multi-hop, wireless networks where mobile hosts and nodes cooperate to maintain network connectivity without a formally-established routing communication infrastructure. In these networks, each node can act as a router, originating and forwarding message packets to achieve communication between nodes. Since most of the mobile devices are portable and their energy is constrained, the life of network is likewise affected by the battery life of individual nodes in the network. If one node loses power, the network may thus be partitioned into two isolated networks. Therefore, to increase the network lifetime, the nodes should be used with energy efficiency as a consideration.

To determine the most efficient path with respect to energy use, it is often useful to find the shortest path from the source node to the destination node, comprising a minimum number of intermediate forwarding nodes. However, it is possible that some of the nodes along the route will still be unfairly burdened when supporting packet-relay functions. Such "hot spot" nodes may consume a greater amount of battery energy, and cease operation earlier than other nodes, disrupting operation of the overall ad hoc network. This is particularly true for some optimized routing protocols that operate using preferred mobile nodes in the selection of routing paths.

To improve the energy efficiency of a network, various power-efficient algorithms have come into existence. These include power-aware routing, battery-aware routing, power-aware source routing, least-prediction routing, Global Energy Aware routing, and local Energy Aware routing. All use on-demand routing (described in more detail below) as a basis for operation. For example, in Local Energy Efficient Protocol (LEEP), two assumptions are made: that all nodes in a network are willing to participate in communication (which is often unrealistic), and that if one node fails in the routing process, all transmissions are to resume from the source (which causes network congestion and increases routing algorithm complexity).

Routing protocols in ad hoc networks can be categorized in two groups: proactive (e.g., table-driven) and reactive (e.g., on-demand). In proactive routing protocols, each node has one or more tables that contain the latest information of the routes to any node in the network. Each row has the next hop for reaching a node/subnet and the cost of this route. Various table-driven protocols differ from each other in the way the information about a change in topology is propagated through nodes in the network.

Reactive routing is sometimes also known as on-demand routing. These protocols take a lazy approach to routing. They do not maintain or constantly update their route tables with the latest route topology. An example of a reactive routing protocol is Dynamic Source Routing (DSR). Most power efficient routing algorithms are designed using this approach because of its simplicity and efficiency.

Two principal components of DSR are the source route, and the route cache. Two primary activities of DSR are the route discovery procedure and the route maintenance procedure. When a mobile node has a packet to send to a destination, it initiates the source route discovery procedure by broadcasting a route request message (ROUTE_REQ). Intermediate nodes piggyback their identities on the source route included in the ROUTE_REQ message and rebroadcast the message. Thus, each node, whether it is the source, the destination, or an intermediate node, receives multiple messages along different paths. The best route included in the messages is chosen according to the path length. Since the first message to arrive at the source usually contains the shortest source route, it is reasonable to choose this message and ignore all others. In that sense, the DSR protocol is said to be non-blocking because every participating mobile node does not have to wait indefinitely for more messages to arrive after receiving the first one.

A destination node simply reacts to a ROUTE_REQ message by immediately sending a route reply message (ROUTE_REPLY) to the source node and ignores all later messages having the same source-destination pair. Unfortunately, the DSR route discovery procedure tends to cause a traffic surge as the query is propagated through the network.

The DSR route cache is used to reduce the amount of traffic. Each mobile node maintains its own route cache that contains the source routes destined for other mobile nodes. Entries in the route cache are continually updated as new routes are learned. For example, a source node S can initiate a route discovery procedure by broadcasting a ROUTE_REQ message to find a path to a destination node D. Intermediate nodes (for example, node A) operate to forward the message to node B. Normally, node B would operate to rebroadcast the message, but in this example, node B stops flooding the network with broadcast messages, since an available route to the destination node D is found in its route cache. A ROUTE_REPLY message is then generated to be sent to the source node S by node B. The ROUTE_REPLY message includes the identities of intermediate nodes recorded in the route cache.

Reduced power routing protocols also suffer from some deficiencies. For example, in Minimum Power Routing, the chosen route is based on the minimum power required to send a packet from source to destination. The disadvantage of this technique is that variable packet size transmission leads to the selection of many routes, since it is assumed that the power needed for transmission and reception is a linear function of $d^a$ where d is distance between the two neighboring nodes, and a is a parameter that depends on the physical environment. GPS (Global Positioning System) position information is used to transmit packets with minimized transmit energy. However, GPS cannot provide the nodes much information about the physical environment and the GPS device power dissipation overhead adds to the ultimate energy cost.

Battery-Cost-Aware Routing is an approach that attempts to always select the least-power cost route. As a result, nodes along these routes tend to die from premature battery energy exhaustion. This can be detrimental to the overall network, since the nodes that die may be the precisely the ones that are needed most to maintain network connectivity (and hence a useful service life). Therefore, it is sometimes better to use a higher-power cost route to avoid using nodes that have a small amount of remaining battery energy.

These observations give rise to a number of alternatives within this area, including:
1. Minimum Battery Cost Routing: minimizing the total cost of the route by minimizing the summation of the inverse of the remaining battery capacity for all nodes along the routing path.
2. Min-Max Battery Cost Routing: tries to avoid the route with nodes having the least battery capacity among all nodes in all possible routes. Attempts to provide fair use of the battery of each node.
3. Conditional Min-Max Battery Cost Routing: chooses the route with minimal total transmission power if all nodes in the route have remaining battery capacities higher than a threshold. Routes that include nodes with lower remaining battery capacities are avoided.

Power-aware Source Routing (PSR) can be used to extend the useful service life of a MANET (Mobile Ad-hoc NETwork). This is useful since the death of nodes can lead to network partitions, rendering some live nodes unreachable. PSR solves the problem of finding a route p at route discovery time t such that the cost function of the following equation is minimized:

$$C(\pi, t) = \sum_{i \in \pi} C_i(t), \text{ where}$$

$$C_i(t) = \rho_i \cdot \left(\frac{F_i}{R_i(t)}\right)^\alpha.$$

In this case, $\rho_i$ is the transmit power of node i, $F_i$ is the full-charge batter capacity of node i, $R_i$ is the remaining battery capacity of node i, and $\alpha$ is a positive weighting factor.

In DSR, because the route selection is based on finding the shortest path (e.g., routes with the minimum number of hops), the mobility of the nodes may cause a selected path to become invalid. In PSR, both node mobility and node energy depletion may cause the selected path to become invalid.

For DSR, the ROUTE_REQ message is propagated towards the destination node. As a part of Global Energy Efficient Routing (GEAR), each node along the route piggybacks its power-related measure (e.g., the remaining battery power) as well as its identity on the ROUTE_REQ message and forwards the message to other nodes in the network via broadcasting. The destination node thus receives multiple request messages and chooses the best route with respect to the given power metric. However, the GEAR protocol is inherently unable to utilize a route cache because each node does not have the power-related information of downstream nodes recorded in its route cache. The absence of a route cache can lead to a flood of route request messages, and surges in traffic. Another difficulty arises in that the destination node has to wait until it receives all request messages along all possible routing paths to choose the best path. A limit on the waiting period can be specified, but if this occurs, routing paths with better metrics may not be considered. On the other hand, a long waiting time will affect the average network response time.

Local Energy-Aware Routing (LEAR) protocol takes energy efficient routing into consideration by scripting the operations of the source node, intermediate nodes, and the destination node as follows:

Source Node: broadcasts a ROUTE_REQ message; waits for the first arriving ROUTE_REPLY message; selects the source route contained in the message; and ignores all later replies.

Intermediate Node: Upon receipt a ROUTE_REQ message (a) if the message is not the first trial and node energy<threshold, lower threshold by decrement amount d; (b) if the node has the route to the destination in its cache, and node energy is >threshold, forward (unicast) the ROUTE_CACHE message and ignore all later requests; otherwise, if node energy<threshold, forward (unicast) a DROP_ROUTE_CACHE message and ignore all late requests; and (c) if the node does not have the route to the destination in its cache, and node energy is >threshold, forward (unicast) the ROUTE_CACHE message and ignore all later requests; otherwise, if node energy<threshold, forward (unicast) a DROP_ROUTE_REQ message and ignore all late requests.

Destination Node: upon receipt the first arriving ROUTE_REQ message or the ROUTE_CACHE message, send a ROUTE_REPLY message to the source node with the source route contained in the message.

The LEAR protocol assumes that all the nodes in the network are willing to participate in the communication activity based, for example, on military applications where all nodes have a common goal. Commercial applications, on the other hand, can't afford to make this assumption. Some nodes may want to conserve their own resources, entering the network only when self-originated packets are to be transferred. These nodes are defined as "selfish nodes", as opposed to a "failed node", which is willing to both originate and forward data, but is unable to successfully do so. A failure to forward data during the routing process, whether due to a selfish node or a failed node, results in re-starting the routing process from the source node, increasing network congestion and the complexity of the routing algorithm. The following principles may be implemented to provide a number of improvements in the LEAR protocol, among others.

First, it is accepted that not all the nodes are willing to participate in general network routing activities. For example, they may operate to forward packets only when those packets are self-originated, and refuse to forward any other packets (e.g., by switching off).

Second, the routing path from source to destination may be explored with the intention of using nodes that have higher levels of energy first, and using lower-energy routes later.

Third, to increase the speed of routing, zone routing protocols (both proactive and reactive routing strategies) are used. The network can be divided so that proactive routing is used between clusters, and both proactive and reactive routing is used within clusters.

Finally, dead nodes can be removed from cached routing tables, and alternate paths can be discovered by backtracking the nodes that have already been traversed on the path from the source to the destination.

To make use of these four principles, a new variable "count" can be introduced to determine the selfish nature of any particular node. This variable may be initialized to any value, such as zero.

The packets originated by the nodes and the packets forwarded by nodes can be distinguished using the count variable. If the node forwards a packet originated by another node, the count variable may be adjusted in one direction (e.g., incremented), and if the node sends a self-originated packet (i.e., a packet originated by that node), then the count variable may be adjusted in another direction (e.g., decremented).

The value of the variable can be sent with packets that are routed on their way to the destination node. Each packet may contain the sending node identification, the count variable value, and information regarding whether the packet is self-originated, or forwarded. If the value of count if found to be less than zero (assuming it was initialized to a value of zero, and incremented/decremented as described), then the node is discarded within the network and treated as a dead node. Related information can then be updated in the local cluster via multicasting to maintain a consistent routing table.

Entries corresponding to the dead node found in nodal route caches can be removed, and an alternate path is found by backtracking through previously-traversed nodes. This process includes checking the route caches of nodes along the original (now discarded) route for entries having node identities with two or more diverging routes.

Pro-active routing can be used within small clusters so as to maintain a consistent view of the cluster and to neglect the nodes that are not participating in packet forwarding activity. These clusters are then further concatenated via reactive routing protocols.

Greedy strategies can be used to select the routing path with greater energy, so that the network lifetime is longer, saving the energy of weaker nodes. Security schemes (e.g., encryption) can be used to protect the count variable from unauthorized manipulation. In some embodiments, these activities can be implemented by establishing a few concrete protocol environment characteristics.

For example, each node may be considered as having some energy value E. Each node may also have an associated cache, perhaps embedded in the node by the manufacturer at the time of construction. The cache of each node may store entries of routes which the node has previously traversed when acting as a destination node, along with the count variable to keep track of the selfish nature of node. The count variable is used to differentiate between messages originated and merely forwarded by the node, by incrementing and decrementing. The Threshold value Th is set for the lowest acceptable energy a node can have (e.g., a level which permits originating some number of messages, but does not permit ad hoc message forwarding). The route cache contain entries regarding routes and a count variable, which can be initialized to any value (e.g., zero). Count information can be locally distributed locally, using proactive routing strategies are used.

One possible protocol that can be used to implement the principles and environment described above can be described as follows:

Source Node: the source node S that wants to communicate data to a destination node D broadcasts a ROUTE_REQ message to all of its neighboring nodes (one-hop distance); the node S waits for the first arriving ROUTE_REPLY message from the destination D, which has the address of all intermediate nodes traversed (i.e., the traversed nodes) to arrive at a power-optimal route; the source node S then selects the source route contained in the first arriving ROU- TE_REPLY message, which is the route that can be constructed using the address of all traversed nodes to get the power optimal route; the source node S then ignores all later replies.

Intermediate Node: Upon receipt of a ROUTE_REQ message, if the message is not the first trial and (E<Th), the threshold Th may be decremented (lowered) for that node by a predefined value d. In an intermediate node, a particular message from the source node may arrive more than once via different routes. So whenever a message reaches an intermediate node for the first time with the entire source route (a route from the source node S to the destination D), it will be considered as a "first trial" and all subsequent trials for the same message with different source routes will be ignored if and only if the energy associated with the subsequent trials is less than threshold value That is, once an intermediate node having E>Th(reshold) receives the route from the source node, acceptance of subsequent source routes for the same message can be locked, avoiding any subsequent comparisons of other source routes for that particular message.

Once a node has decremented its energy threshold Th by a predefined value, and if E>Th holds afterward, the node can take part in the routing until E declines to some level below newly set Th. Once this occurs, the node may be considered as a failed node in some embodiments. In addition, for subsequent message transfers, if the energy is less than the initial Th or the lowered Th (depending on the embodiment, a history of the energy threshold level Th may be maintained), the node may be considered as a dead node with respect to further routing activity. The threshold value is constant across the network when routing of the message begins, and it is decremented as the message trials occur. The threshold is decremented only for the concerned intermediate node, not for all nodes along the route.

If the intermediate node has the route to the destination node D in its cache and if (E>Th), then the intermediate node increments the variable by one and forwards (via unicast) a message directing the next node to ROUTE_CACHE+increment the count value by one of all nodes in route and ignore all later requests. Else, if the route to the destination node D is not in its cache and if (E>Th), the intermediate node increments count by one and broadcast a CHECK_REQ message to check the count value of neighboring nodes. Selfish nodes will wait until prompted by receiving a CHECK_REQ message from an intermediate node to broadcast their selfish condition. Then the intermediate node will forward (unicast downstream) a message including the ROUTE_CACHE message+increment the count value to send the ROUTE-CACHE command to only the nodes in the cached route.

When the CHECK_REQ message is received by a neighboring node and the count value is less than zero (assuming previous reset and increment/decrement conditions), this shows that the node is selfish and should be considered dead. The selfish node will then broadcast a message with the selfish node identification, as well as an authentic signature, to all the nodes within some network diameter (e.g., a diameter of three hops) proactively, to inform other nodes that it is dead and that further communication with this selfish node should not be entertained. The diameter can be selected based on the cluster size, such as from one hop to any number of hops desired.

All the nodes in local diameter then check their cache table entries. Entries having the selfish node are invalidated and a DROP_NODE message is sent to the source node. For example, given a group of nodes: U->T->S->R->Q->P->A->B->C->D->E->F, where node B is declared dead due to a negative count value, backtracking is done and a DROP_NODE message is sent by node A to node S via nodes P, Q, and R. The route cache table entries of each node are checked consecutively, from nodes A to S, until an entry for a node is found that has two or more (different, divergent) paths which can be followed to reach destination node. When these paths are located, the cache entries for each node along the route (in this case, from nodes S to A) are updated. A DROP_NODE message is sent to the source node S via backtracking of the traversed nodes. Only one DROP_NODE message is sent for each selfish node that is found, all along the route through the intermediate nodes, telling them to drop the selfish node from their respective route cache entries, as needed.

When the CHECK_REQ message is received by a neighboring node and the count value is not less than zero, the intermediate nodes forwards (via broadcast) the ROUTE_REQ message by concatenating its authentic address, along with its incremented count and current energy measure. The intermediate node then ignores all later ROUTE_REQ message (in order to select the shortest route).

Destination Node: Upon receiving the first arriving ROUTE_REQ message from various routes, the destination node D checks the source of the message and selects the route with maximum energy, in order to conserve lower energy routes. This occurs because every intermediate node forwards a ROUTE_CACHE message (which instructs the next node to cache the route to that point), along with the ROUTE_REQ message (that has concatenated traversed node identification information, all the way back to the source) to the next immediate node along the downstream route to the destination. Thus, when the ROUTE_CACHE message reaches the destination node D, it will enable the destination node to select the route with maximum energy, which turns out to be the optimal energy route from the source node S. The destination node D can then send the ROUTE_REPLY message back to the source node S.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 1:
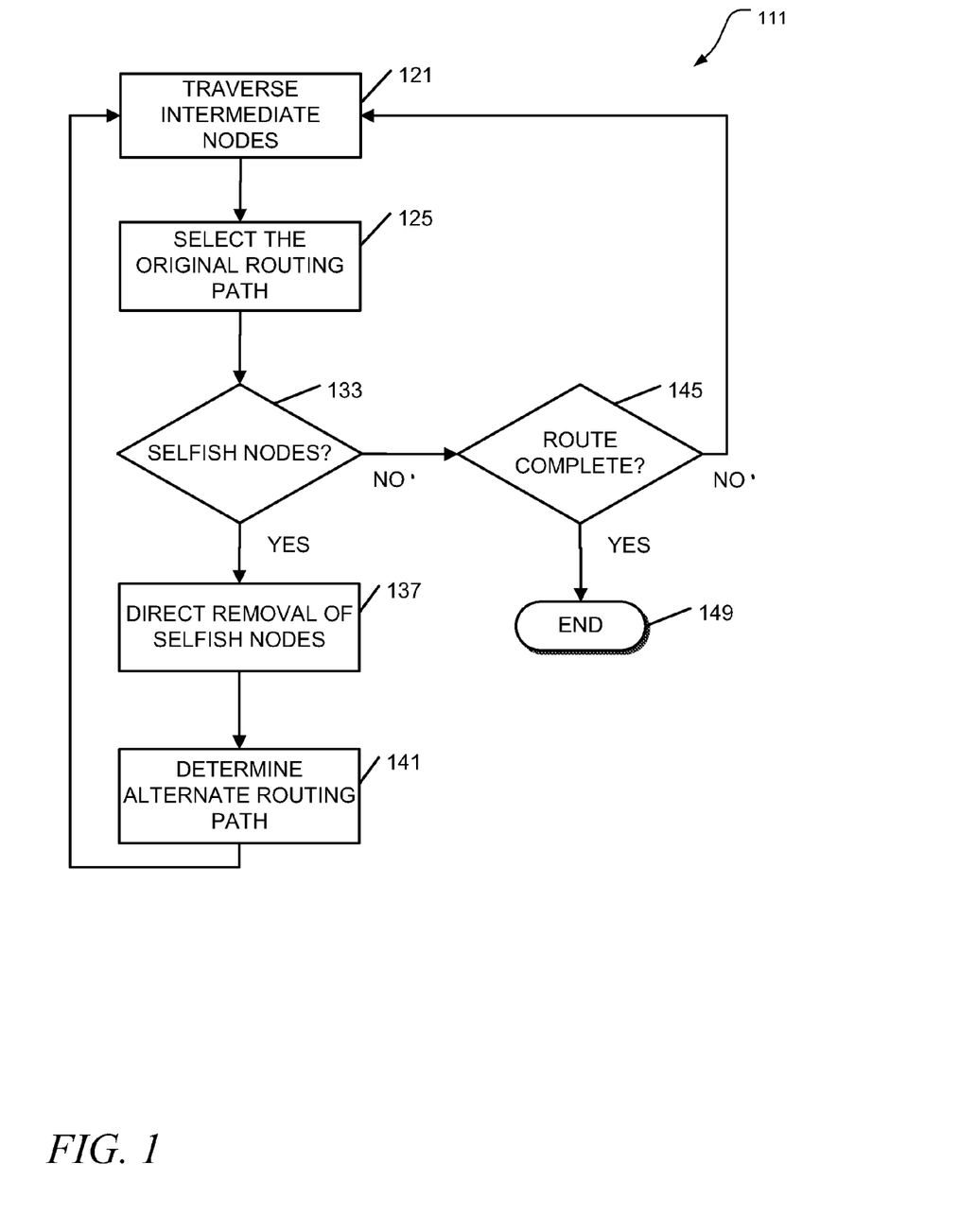
FIG. 1 is a flow diagram illustrating routing protocol methods according to various embodiments of the invention.

FIG. 1 is a flow diagram illustrating routing protocol methods 111 according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when executed by a specific machine, perform the processing depicted in FIG. 1. Given this context, a routing protocol is now discussed with reference to FIG. 1.

In some embodiments, a processor-implemented method 111 that can be executed on one or more processors that perform the routing protocol may operate, as viewed from the perspective of an intermediate node, for example, by traversing intermediate nodes as traversed nodes in a network during network routing operations to determine an original routing path for a source message from a source node in the network to a destination node in the network by using proactive routing between clusters of nodes in the network, and both proactive and reactive routing within the clusters.

The method 111 may continue on to block 125 with selecting the original routing path according to a greedy energy strategy that operates to define the original routing path as a path having a greater energy value associated with the intermediate nodes than other paths.

The method 111 may continue on to block 133. If selfish nodes are not discovered, and the route has been completed by reaching the destination node with the ROUTE_REQ message as determined at block 145, then the method may terminate at block 149. If the route is not yet complete, the method 111 may continue on to block 121 with traversing additional intermediate nodes.

Upon discovery of selfish nodes (the selfish nodes being neighbors to at least one of the intermediate nodes) by one of the intermediate nodes at block 133, the method 111 may continue on to block 137 with directing removal of the selfish nodes from route caches associated with the traversed nodes.

As noted previously, selfish nodes can be discovered using counters in the network nodes. The counters keep track of whether messages are originated, or merely forwarded, and can be reset to some starting value (e.g., zero) whenever a new message is to be routed. Thus, the activity at block 133 may include discovering selfish nodes by adjust counters in the traversed nodes in a first direction (e.g. incrementing) when the traversed nodes forward the source message, and adjusting counters in nodes neighboring the intermediate nodes in a second direction (e.g., decrementing) when another message to be routed in the network is originated by the nodes neighboring the intermediate nodes. The selfish nodes may then be discovered by checking the values of the counters in those nodes neighboring the intermediate nodes.

The method 111 may continue on to block 141 with determining an alternate routing path for the source message in the network, the alternate routing path different from the original routing path, perhaps by searching route caches in the traversed nodes in the network to discover the alternate path. Determining the alternate routing path may include searching route caches in the traversed nodes to locate divergent routes to the destination. Many other embodiments may be realized.

Figure 2:
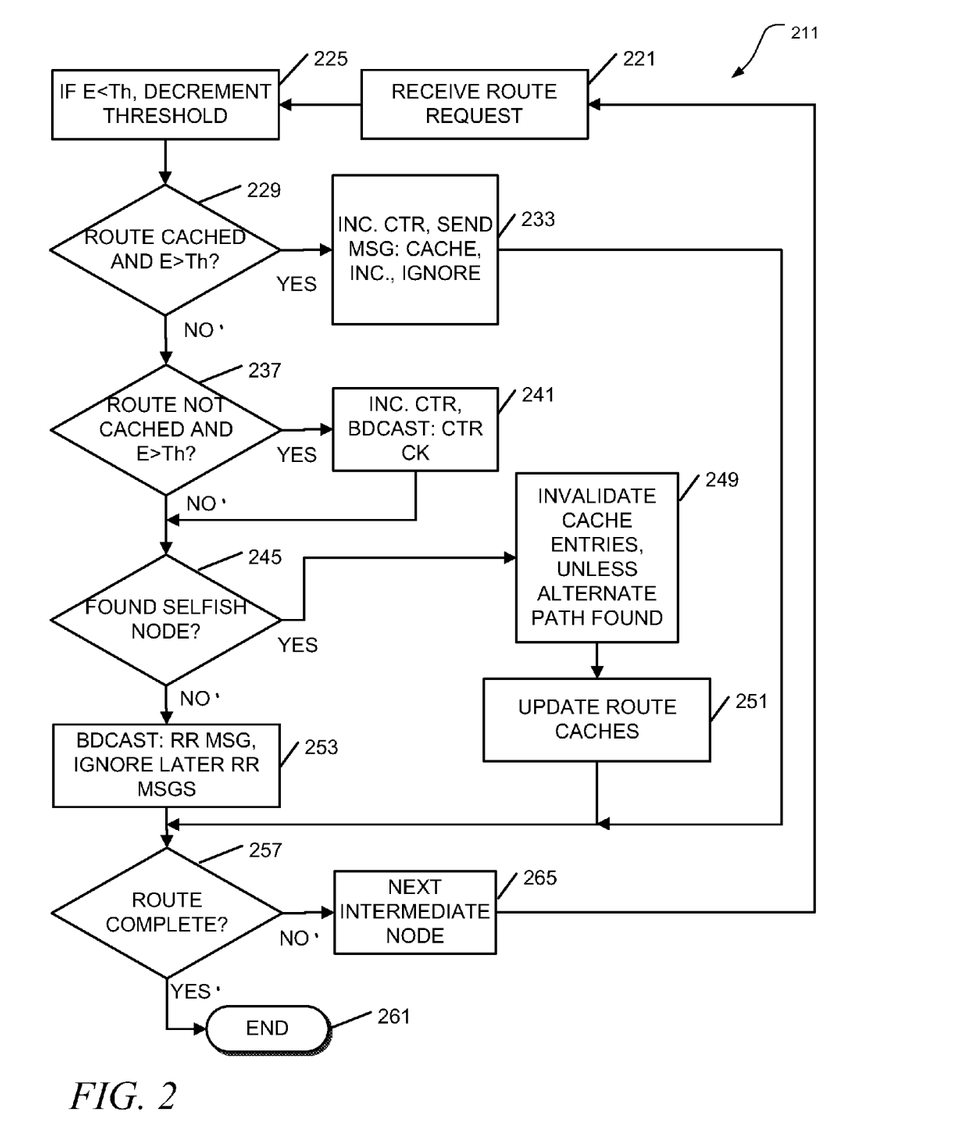
FIG. 2 is a flow diagram illustrating additional routing protocol methods according to various embodiments of the invention.

For example, FIG. 2 is a flow diagram illustrating additional routing protocol methods 211 according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when executed by a specific machine, perform the processing depicted in FIG. 2.

Thus, in some embodiments, a processor-implemented method 211 that can be executed on one or more processors that perform the method may begin at block 221 with receiving, from a source node, a route request message associated with a destination node at an intermediate node.

The energy threshold of all nodes in the network is reset to the same value when a new message is to be routed. However, the energy threshold of individual intermediate nodes can be decremented during the route discovery process for a particular message. Thus, the method 211 may continue on to block 225, with decrementing the threshold associated with the intermediate node by a predetermined amount, to provide a revised threshold when the energy associated with the intermediate node is not above the threshold (so that future comparisons of the energy associated with the threshold and the same ROUTE_REQ message will make use of the revised threshold).

The energy level of node may correspond to a measure of the remaining battery power that is available to supply all node operations, or the remaining battery power that is available for and reserved to routing messages by the node. Thus, the energy associated with the intermediate node may correspond substantially to a level of remaining battery power that is made available to the node.

The method 211 may continue on to block 229, such that when the intermediate node has a route to the destination node in its route cache and energy associated with the intermediate node is above the node's threshold, the method 211 will include the activity at block 233, with the intermediate node operating to adjust its counter in a first direction (e.g., increment) and to send a message to additional nodes along the route to cache the route, to increment their corresponding node counters, and to ignore later route requests. This activity may take the form of sending a CACHE_ROUTE+INCREMENT_COUNT+IGNORE_ROUTE_REQUEST message. The method 211 may continue on from this point to block 257.

When the intermediate node does not have the route in the route cache and the energy associated with the intermediate node is above the threshold, as determined at block 237, the method 211 may continue with block 241 with adjusting the counter associated with the intermediate node in first direction (e.g., incrementing), and broadcasting a counter check message to neighboring nodes.

"Neighboring nodes" are defined as nodes that are in the network and located some designated network distance away from the intermediate node. Neighboring nodes may reveal themselves to be selfish nodes in response to the COUNTER_CHECK message (e.g., when their counter is less than zero, assuming an integer counter is incremented by a value of one in the first direction, and decremented by a value of one in the second direction). If selfish nodes are discovered, a DROP_NODE message can be sent by the intermediate node back along the route to the source node for each selfish node that is discovered. Thus, when selfish nodes are found, as determined at block 245, the method 211 may proceed to block 249, and the intermediate node may operate to send a message to nodes along the route to invalidate entries in route caches associated with the neighboring nodes that reveal themselves to be selfish nodes (e.g., in response to the counter check message). Counter values less than zero (where zero is the designated starting value of the counter), may serve to indicate that a node should be characterized as selfish. Thus, selfish nodes may be revealed when the node counters corresponding to the selfish nodes have a value that is above or below a designated value associated with selfish behavior, depending on the direction of counter value adjustment associated with initiating, as opposed to forwarding messages.

Therefore, the method 211 may comprise receiving identification from at least one of the neighboring nodes that reveals itself to be a selfish node by way of a selfish message broadcast from the one of the selfish nodes to its neighbors, the neighbors comprising all nodes within a designated network distance.

The designated distance might comprise a distance of one, two, three, or more hops between network nodes. Thus, the designated distance can be defined in terms of a number of network hops.

Selfish nodes that are cached in route caches along the route from the intermediate node to the source can be dropped upon command, perhaps by the intermediate node that discovers their existence as a neighboring node. Thus, the activity at block 249 may include sending a drop node message to a source node associated with the route request message when at least one of the neighboring nodes reveals itself to be one of the selfish nodes.

If a path to the destination is found in the route cache of the intermediate node, there is no need to send a DROP_NODE message back toward the source node. As noted previously, if a selfish node is found, backtracking is done and a DROP_NODE message is sent by the node immediately upstream to the source node via intermediate nodes and the cache table entry of each intermediate node is checked consecutively, from the node generating the DROP_NODE message to the source node, until an entry is found in the route cache of one of the upstream (intermediate) nodes that has two or more paths (i.e., divergent paths) which can be followed to reach the destination node. At this point, the route cache for each intermediate node is updated with the new routes. In prior systems (e.g., LEAR) that don't search for an alternative path and send a DROP_NODE message to the source node irrespective of the situation, all transmission is done from the starting point, which causes congestion in the network and increases the complexity of the routing algorithm. Thus, the activity at block 249 may also comprise refraining from sending a drop node message to a source node associated with the route request when an alternative path is found in the route cache of the intermediate node.

Thus, in some embodiments, an alternate route can be discovered by searching back toward the source from the intermediate node to find diverging routes in the route caches associated with other intermediate nodes along the route. Therefore, the activity at block 249 may include receiving a drop node message at a node along the route that is not the intermediate node; and searching the route cache associated with the node along the route to find an alternate route to the destination node.

When an alternate route is discovered by the intermediate node, the entries in the route cache of all nodes from the intermediate node to the source can be updated to include the alternate route. Thus, the method may continue on to block 251 with updating entries in the route cache associated with each node along the route to the source node that is not the intermediate node to incorporate the alternate route. The method 211 may continue on from block 251 to block 257.

When none of the neighboring nodes reveal themselves to be selfish nodes (e.g., in response to a counter check message sent from the intermediate node), as determined at block 245, the method 211 may continue on to block 253, with broadcasting the route request message comprising traversed node identifications, indications of values of the counter and the energy associated with the intermediate node, and ignoring the later route requests. The method 211 may continue on from block 253 to block 257.

If the routing is not complete, as determined at block 257, the method 211 may continue on to block 265, with operations at the next downstream intermediate node, returning to block 221. If the routing is complete, as determined at block 257, the method 211 may include receiving a first arriving route reply message in response to the route request message at the source node, selecting the route included in the route reply message to route the message from the source node to the destination node, and ignoring subsequent route reply messages. In this way, the source node can act on the first route reply message that arrives in response to the route request message, ignoring all subsequent replies. The method 211 may then terminate at block 261.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The routing protocol methods shown in FIGS. 1 and 2 can be implemented in various devices, as well as in a computer-readable storage medium, where the methods are adapted to be executed by one or more processors. Further details of such embodiments will now be described.

Figure 3:
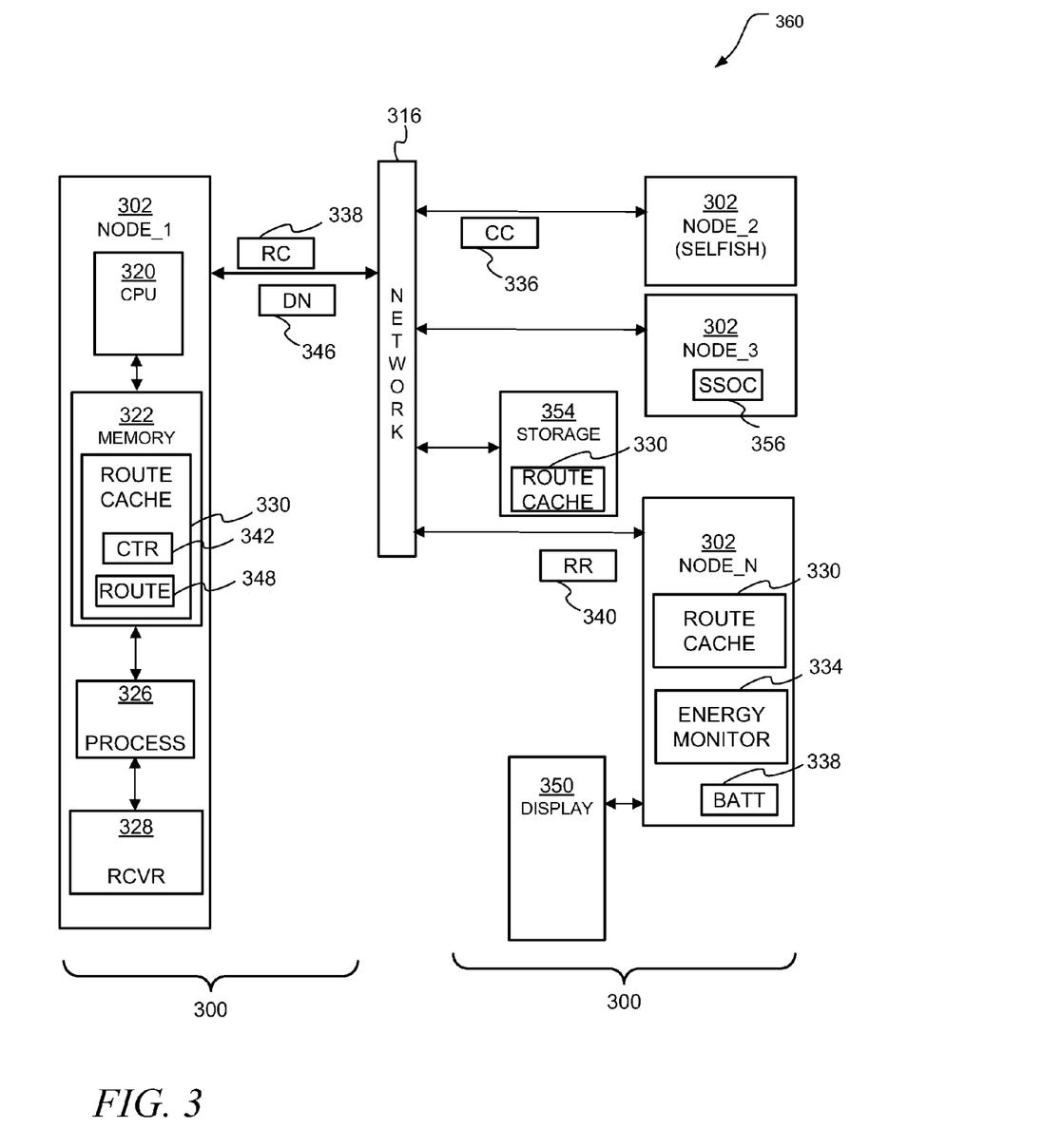
FIG. 3 is a block diagram of routing protocol apparatus and systems according to various embodiments of the invention.

FIG. 3 is a block diagram of routing protocol apparatus 300 and systems 360 according to various embodiments of the invention. Here it can be seen that an apparatus 300 used to implement various routing protocols may comprise one or more processing nodes 302, one or more processors 320, memory 322, a processing module 326, and a reception module 328. In many embodiments, the nodes 302 include a route cache 330, and an energy monitor 334. The apparatus 300 may comprise a server, a client, a laptop computer, a cellular telephone, or some other networked processing node.

The processing nodes 302 may comprise physical machines or virtual machines, or a mixture of both. The nodes 302 may also comprise networked entities, such servers and/or clients. In some implementations, the operations described can occur entirely within a single node 302.

In some embodiments then, an apparatus 300 may comprise a reception module 328 in an intermediate node (e.g., NODE_1) to receive, from a source node (e.g., NODE_N), a route request message 340 associated with a destination node (e.g., NODE_3). The apparatus 300 may further include a processing module 326 in the intermediate node to determine that when the intermediate node has a route to the destination node in its route cache 330 and energy associated with the intermediate node is above a threshold, a counter 342 associated with the intermediate node is to be adjusted (e.g., incremented) and a message 338 is to be sent to additional nodes along the route to cache the route, to adjust corresponding node counters, and to ignore later route requests.

The processing module 326 may be used to determine that when the intermediate node does not have the route in the route cache 330 and the energy associated with the intermediate node is above the threshold, the counter 342 associated with the intermediate node is to be adjusted, a counter check message 336 is to be broadcast to neighboring nodes (e.g., NODE_2), and entries in route caches (e.g., entries in the route cache 330 of NODE_1) associated with the neighboring nodes that reveal themselves to be selfish nodes (e.g., NODE_2) in response to the counter check message are to be invalidated.

The processing module 326 may be used to determine that when none of the neighboring nodes reveal themselves to be selfish nodes in response to the counter check message 336, the route request message 340 comprising indications of values of the counter and the energy associated with the intermediate node is to be broadcast, and that later route requests are to be ignored. The route cache 330 associated with the intermediate node may be housed in the intermediate node, or elsewhere, such as in a storage node 354.

Nodes 302 may comprise an energy monitor 334 to determine the amount of the energy associated with the node. Thus, the energy monitor 334 may be used to monitor the level of energy as remaining power or capacity of a battery 338 included in the same node, or a different node. That is, the energy associated with a particular node may correspond substantially to a level of remaining power in the battery, among other measures. The counter 342 associated with a particular node may be stored in the route cache 330 of the same node, or elsewhere. Still further embodiments may be realized.

For example, it can be seen that a system 360 that operates to implement various routing protocols may comprise multiple instances of the apparatus 300. The system 360 might also comprise a cluster of nodes 302, including physical and virtual nodes. It should be noted that any one of the nodes 302 may include any one or more of the elements explicitly shown in any other one of the nodes NODE_1, NODE_2, NODE_3, . . . NODE_N.

In some embodiments then, a system 360 can operate using one or more nodes 302. That is, a system 360 may comprise a source node (e.g., NODE_N) and a destination node (e.g., NODE_3). The source node may operation to transmit a route request message 340 associated with the destination node. The system 360 may further comprise an intermediate node (e.g., NODE_1) coupled to the source node via network 316, such as a MANET. The intermediate node can receive the route request message 340 from the source node.

The nodes 302 may exist as a device embedded within another structure (e.g., as an embedded device), or as a regular desktop or laptop computer that includes a display 350 to show the activities conducted while the node 302 is active. Thus, the system 360 may also comprise a display 350 coupled to the nodes 302 to display visible indications of the activities conducted at the nodes 302.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
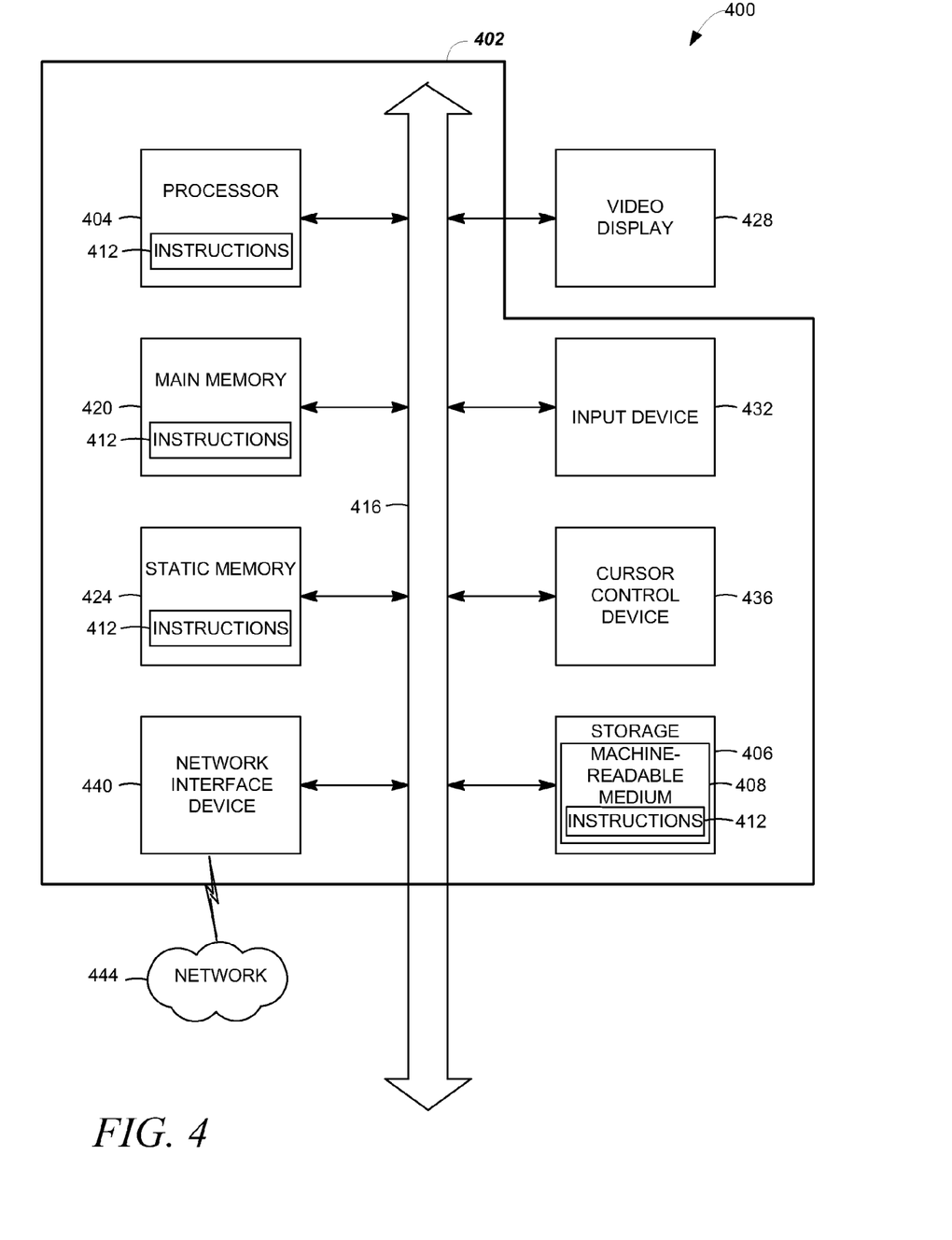
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to reduce or remove deficiencies experienced when LEAR protocol routing is used, by operating to revise routes in an efficient manner when selfish nodes are encountered. Nodal failures along the route will not force reconstruction of the route all the way back to the source node in every case. Increased network operational efficiency, as well as user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus, comprising:
   a reception module in an intermediate node to receive, from a source node, a route request message associated with a destination node; and
   a processing module in the intermediate node to determine that when the intermediate node has a route to the destination node in its route cache and energy associated with the intermediate node is above a threshold, a counter associated with the intermediate node is to be adjusted and a message is to be sent to additional nodes along the route to cache the route, to adjust corresponding node counters, and to ignore later route requests; and to determine that when the intermediate node does not have the route in the route cache and the energy associated with the intermediate node is above the threshold, the counter associated with the intermediate node is to be adjusted, a counter check message is to be broadcast to neighboring nodes, and entries in route caches associated with the neighboring nodes that reveal themselves to be selfish nodes in response to the counter check message are to be invalidated; and to determine that when none of the neighboring nodes reveal themselves to be selfish nodes in response to the counter check message, the route request message comprising indications of values of the counter and the energy associated with the intermediate node is to be broadcast, and the later route requests are to be ignored.

2. The apparatus of claim 1, further comprising:
   an energy monitor to determine an amount of the energy associated with the intermediate node.

3. The apparatus of claim 1, further comprising:
   a battery, wherein the energy associated with the intermediate node substantially corresponds to a level of remaining power of the battery.

4. A system, comprising:
   a source node to transmit a route request message associated with a destination node; and
   an intermediate node coupled to the source node via a mobile ad-hoc network, the intermediate node comprising a reception module to receive the route request message from the source node, and a processing module to determine that when the intermediate node has a route to the destination node in its route cache and energy associated with the intermediate node is above a threshold, a counter associated with the intermediate node is to be adjusted and a message is to be sent to additional nodes along the route to cache the route, to adjust corresponding node counters, and to ignore later route requests; and to determine that when the intermediate node does not have the route in the route cache and the energy associated with the intermediate node is above the threshold, the counter associated with the intermediate node is to be adjusted, a counter check message is to be broadcast to neighboring nodes, and entries in route caches associated with the neighboring nodes that reveal themselves to be selfish nodes in response to the counter check message are to be invalidated; and to determine that when none of the neighboring nodes reveal themselves to be selfish nodes in response to the counter check message, the route request message comprising indications of values of the counter and the energy associated with the intermediate node is to be broadcast, and the later route requests are to be ignored.

5. The system of claim 4, wherein the counter associated with the intermediate node is to be stored in the route cache associated with the intermediate node.

6. A processor-implemented method to execute on one or more processors that perform the method, comprising:
   receiving, from a source node, a route request message associated with a destination node at an intermediate node;
   when the intermediate node has a route to the destination node in its route cache and energy associated with the intermediate node is above a threshold, adjusting a counter associated with the intermediate node and sending a message to additional nodes along the route to cache the route, to adjust corresponding node counters, and to ignore later route requests;
   when the intermediate node does not have the route in the route cache and the energy associated with the intermediate node is above the threshold, adjusting the counter associated with the intermediate node, broadcasting a counter check message to neighboring nodes, and invalidating entries in route caches associated with the neighboring nodes that reveal themselves to be selfish nodes in response to the counter check message; and
   when none of the neighboring nodes reveal themselves to be selfish nodes in response to the counter check message, broadcasting the route request message comprising traversed node identifications, indications of values of the counter and the energy associated with the intermediate node, and ignoring the later route requests.

7. The method of claim 6, wherein the selfish nodes are revealed when the node counters corresponding to the selfish nodes have a value that is below or above the designated value associated with selfish behavior, depending on the direction of the adjusting.

8. The method of claim 6, further comprising:
   decrementing the threshold associated with the intermediate node by a predetermined amount to provide a revised threshold when the energy associated with the intermediate node is not above the threshold so that future comparisons of the energy associated with the threshold and the route request message will make use of the revised threshold.

9. The method of claim 6, further comprising:
   sending a drop node message to a source node associated with the route request when at least one of the neighboring nodes reveals itself to be one of the selfish nodes.

10. The method of claim 6, further comprising:
refraining from sending a drop node message to a source node associated with the route request when an alternative path is found in the route cache of the intermediate node.

11. The method of claim 6, further comprising:
receiving identification of at least one of the neighboring nodes revealing itself to be one of the selfish nodes by way of a selfish message broadcast from the one of the selfish nodes to neighbors of the one of the selfish nodes, the neighbors comprising all nodes within a designated network distance.

12. The method of claim 11, wherein the designated distance is defined in terms of a number of network hops.

13. The method of claim 6, wherein the energy associated with the intermediate node substantially corresponds to a level of remaining battery power available to the intermediate node.

14. The method of claim 6, further comprising:
receiving a drop node message at a node along the route that is not the intermediate node; and
searching the route cache associated with the node along the route to find an alternate route to the destination node.

15. The method of claim 14, further comprising:
updating entries in the route cache associated with each node along the route to the source node that is not the intermediate node to incorporate the alternate route.

16. The method of claim 6, further comprising:
receiving a first arriving route reply message in response to the route request message at the source node; and
selecting the route included in the route reply message to route the message from the source node to the destination node; and
ignoring subsequent route reply messages.

17. A processor-implemented method to execute on one or more processors that perform the method, comprising:
traversing intermediate nodes as traversed nodes in a network during network routing operations to determine an original routing path for a source message from a source node in the network to a destination node in the network by using proactive routing between clusters of nodes in the network, and both proactive and reactive routing within the clusters;
selecting the original routing path according to a greedy energy strategy that operates to define the original routing path as a path having a greater energy value associated with the intermediate nodes than other paths;
upon discovery of selfish nodes by one of the intermediate nodes, the selfish nodes being neighbors to at least one of the intermediate nodes, directing removal of the selfish nodes from route caches associated with the traversed nodes; and
determining an alternate routing path for the source message in the network, the alternate routing path different from the original routing path, by sequentially searching upstream route caches in the traversed nodes in the network to discover the alternate path.

18. The method of claim 17, wherein the discovery of the selfish nodes further comprises:
adjusting counters in the traversed nodes in a first direction when the traversed nodes forward the source message;
adjusting counters in nodes neighboring the intermediate nodes in a second direction different from the first direction when another message to be routed in the network is originated by the nodes neighboring the intermediate nodes; and
discovering the selfish nodes by checking values of the counters in nodes neighboring the intermediate nodes.

19. The method of claim 17, wherein the determining the alternate routing path further comprises:
searching route caches in the traversed nodes to locate divergent routes to the destination.

* * * * *